United States Patent
Hälker

(10) Patent No.: US 7,849,602 B2
(45) Date of Patent: Dec. 14, 2010

(54) METHOD OF ASSEMBLING A CONVERTIBLE ROOF FIXED TO THE BODY VIA MAIN SUPPORT UNITS

(75) Inventor: Jörg Hälker, Bramsche (DE)

(73) Assignee: Wilhelm Karmann GmbH, Munich (DE)

( * ) Notice: Subject to any disclaimer, the term of this patent is extended or adjusted under 35 U.S.C. 154(b) by 341 days.

(21) Appl. No.: 12/023,366

(22) Filed: Jan. 31, 2008

(65) Prior Publication Data

US 2008/0246302 A1 Oct. 9, 2008

(30) Foreign Application Priority Data

Feb. 2, 2007 (DE) ........................ 10 2007 006 073
Feb. 2, 2007 (DE) ........................ 10 2007 006 074

(51) Int. Cl.
*B21D 53/88* (2006.01)
(52) U.S. Cl. ..................... 29/897.2; 29/281.1; 29/281.4; 29/430; 29/525.01; 29/525.02; 296/107.01; 296/107.09
(58) Field of Classification Search ................. 29/897.2, 29/525.01, 525.02, 525.06, 525.14, 430, 29/431, 203.01, 281.4; 296/107.01, 107.09
See application file for complete search history.

(56) References Cited

U.S. PATENT DOCUMENTS 7,469,473 B2 * 12/2008 Savoy ........................ 29/897.2
7,503,623 B2 * 3/2009 Favaretto ................ 296/203.01
7,574,800 B2 * 8/2009 Telehowski et al. ......... 29/897.2
7,574,801 B2 * 8/2009 Lowe et al. ................. 29/897.2
7,596,843 B2 * 10/2009 Spishak et al. ............. 29/281.4
7,610,668 B2 * 11/2009 Sprague et al. .......... 29/525.06

FOREIGN PATENT DOCUMENTS

| DE | 10229045 | 1/2004 |
|---|---|---|
| WO | WO-2006018203 | 2/2006 |
| WO | WO-2007101422 | 9/2007 |

* cited by examiner

*Primary Examiner*—Rick K Chang
(74) *Attorney, Agent, or Firm*—Gifford, Krass, Sprinkle, Anderson & Citkowski, P.C.; Douglas L. Wathen

(57) ABSTRACT

A convertible vehicle having a roof moveable between a stored position to a closed position, and method of manufacturing said convertible vehicle. The roof is supported by a pair of lateral main support units fixed to opposite sides of the vehicle body. Each lateral main support unit has a fastening flange movable along a portion thereof for securing the roof to pins disposed on the vehicle body. The convertible roof is manufactured such that the main support units and the linkage parts are assembled upside down on a fixture replicating the vehicle body. Thus alignment of the roof to the vehicle body is ensured. Furthermore manufacturing tolerances are accommodated by moving the fastening flanges along a portion of the lateral main support units such that the fastening flanges are registered to the pins.

10 Claims, 23 Drawing Sheets

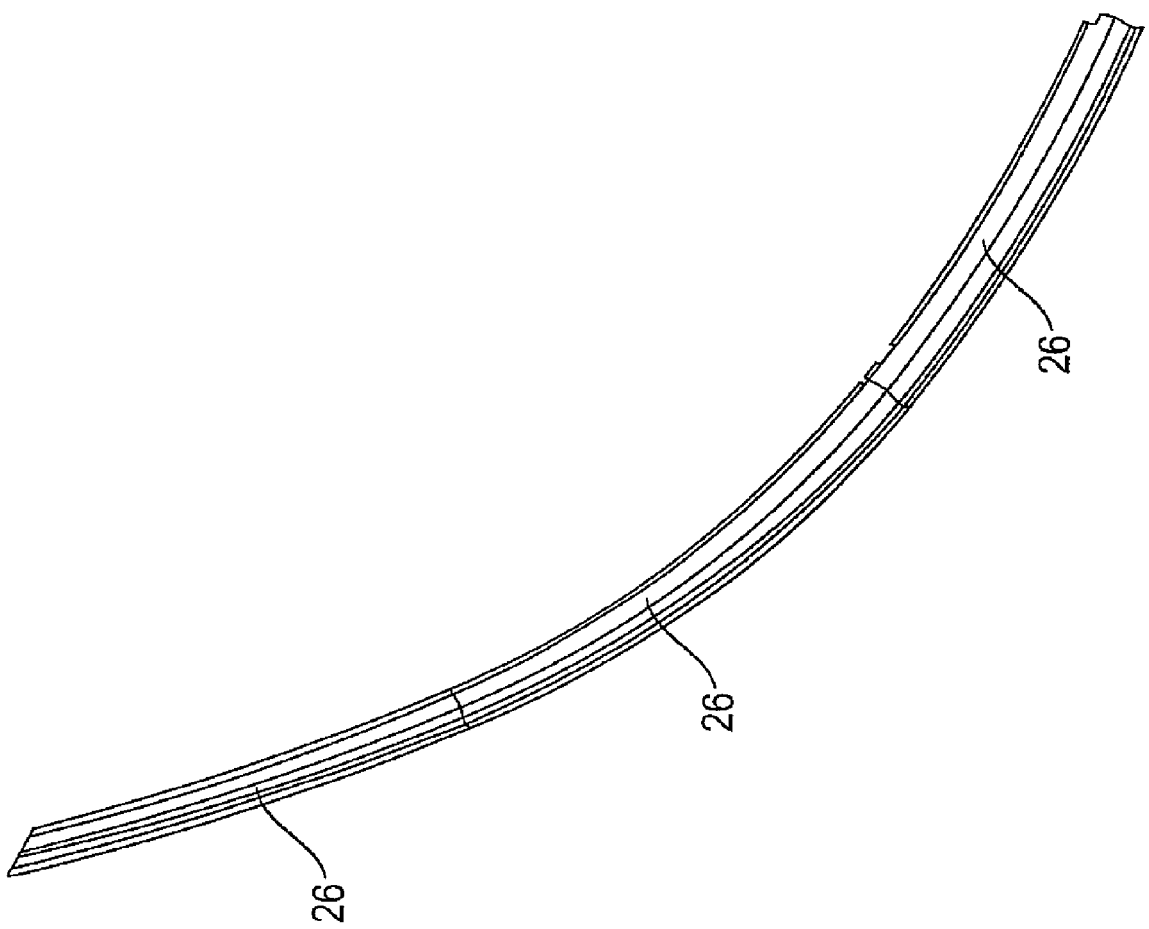

METHOD OF ASSEMBLING A CONVERTIBLE ROOF FIXED TO THE BODY VIA MAIN SUPPORT UNITS

CROSS-REFERENCE TO RELATED APPLICATIONS

This application claims priority of German Patent Application DE 10 2007 006 073.6 filed Feb. 2, 2007, the entire contents of which are incorporated herein by reference.

FIELD OF THE INVENTION

The invention relates to a convertible vehicle and a method of manufacturing a convertible vehicle having a roof fixed to the vehicle body via lateral main support units. The lateral main support units extend into a linkage part to define the roof frame.

BACKGROUND OF THE INVENTION

It is known to assemble and align convertible roofs on a production stand which simulates the roof's position and alignment with respect to the vehicle body onto which the finished roof is to be placed. However, current manufacturing methods position the worker below the roof part thus requiring an assembly worker to perform uncomfortable motions such as bending back to look up at the roof. The production stand is fitted with a crossmember and a rear lateral support console which simulates the spacing between a windshield frame of a vehicle and a vehicle body where the roof is to be mounted. The spacing is such that the vehicle roof as assembled on the stand is able to then be fittingly received by the vehicle. In order to compensate for production tolerances of the roof, it is necessary that the spacing between the crossmember and the lateral support console can receive at least one bearing, specifically the bearing disposed between the linkage part and the lateral main support unit which moves the roof from a stored to a closed position. In addition, the bearing must be provided with a predetermined amount of tolerance. Currently, this tolerance may be provided, for example, by guidance of an axis in lateral elongate holes. However, this results in kinematics of the roof movement which are slightly modified because of the movement's dependence on the tolerance resulting in roof movement with non-optimized torques and jerks under certain circumstances.

SUMMARY OF THE INVENTION

A convertible vehicle according to the present invention includes a roof with a pair of lateral main support units and linkage parts extending therefrom to define the roof frame. The lateral main support units further include a fastening flange for aligning the pair of lateral main support units to the vehicle body thereby properly fitting the roof to the vehicle body. The fastening flanges fix the lateral main support units to the vehicle body such that the roof, when in the closed position, properly engages the windshield frame without having to readjust the bearing of the mechanism for moving the roof thereafter. Thus, the mechanism for moving the roof can always be made in the same way despite tolerance compensations so that roof movement results in an optimized and consistent motion.

Specifically, when the fastening flanges are alignable at least parallel to the longitudinal direction of the vehicle, production tolerances with respect to the roof length between the windshield frame and mounting consoles of the body can be compensated, which is particularly favorable since the largest tolerances occur with respect to this direction.

The transfer of the manufactured roof onto the body of the vehicle is particularly simplified if, in this transfer, the fastening flanges of the lateral main support units can be set onto pins arranged on the body and facing upwardly in an aligned position. These pins correspond to the pins on a tool frame used for the roof production.

The alignment of the fastening flanges can be further simplified by including elongate holes through which fastening means can be used to engage corresponding bores in the main support units.

A method is also provided for manufacturing a convertible vehicle whereby the alignment of the roof is achieved with respect to the production tolerances and does not interfere with the bearings of the mechanism for moving the roof. The method disclosed herein is favorable to the ergonomics of an assembly worker in that the assembly worker does not have to bend backwards to look up and work on the roof. The roof has a length which is always the same, and includes lateral main support units having fastening flanges disposed thereon, where the position of fastening flanges may be adjusted.

The lateral main support units are aligned to the respective vehicle body by an upper tool frame. This alignment can thus be achieved solely by lowering the upper tool frame without manual intervention, whereby the error sources are minimized and the ergonomics of the manufacturing process is further improved. The upper tool frame aligns the fastening flanges of the lateral main support units such that the fastening flanges are positioned to engage the vehicle body.

Such an automated alignment of the fastening flanges can be carried out when the lowered upper tool frame is equipped with downwardly engaging pins which engage openings on the fastening flange and align it with respect to the support body held in a fixed position via the positioned linkage.

The fastening flange further includes elongated holes such that once the flange is aligned by the upper tool frame, the flange can be simply fixed to the lateral support units using fasteners that extend through the elongate holes.

Upon fixing the fastening flanges into position with respect to the lateral main support units, the next step in the method is to provide the vehicle body with pins corresponding to the fixed position of the fastening flanges. The roof may be transposed onto the vehicle body whereby the vehicle body pins engage the fastening flanges and hold the roof thereto. Accordingly, the vehicle body pins are positioned to correspond to the upper tool frame pins.

The manufacturing method in accordance with the invention can also be optimized for different roof lengths within a series—for example, the longitudinal frame parts of the roof are covered with solid plate parts in a first embodiment and have a textile covering in a second embodiment and a vinyl covering in a third embodiment. The upper tool frame aligns the respective fastening flange in each case and is adjustable in an optimized manner. The position of the flange relative to the upper tool frame is dependent on the roof design for the solid plates without tensile strain on the joints of the roof mechanism, for the textile covering with some strain in the longitudinal direction and for the vinyl covering with more strain in the longitudinal direction onto the roof mechanism. Even those fine differences within the hinge clearance can add up to a total of up to three millimeters.

In addition, the upper tool frame, which is lowerable from above, can further include downwardly projecting fixing means for the adjustment of front closures at the front with respect to the longitudinal direction of the vehicle. The front closures are associated with a roof tip. The fixing means always ensures correct alignment between the roof tip and the vehicle mount.

Furthermore, the tool frame may also be provided with downwardly extensible fixing means for the adjustment of the roof parts in the apparatus such that the roof parts do not have to be fixed at their downwardly facing painted outer side and the risk of paintwork damage is thereby minimized.

Further advantages and features of the invention result from an embodiment of the subject matter of the invention shown schematically in the drawing and described in the following.

BRIEF DESCRIPTION OF THE DRAWINGS

Advantages of the present invention will be readily appreciated as the same becomes better understood by reference to the following detailed description when considered in connection with the accompanying drawings.

FIG. 5a is an isolated view of a section of sealing rail mountable from the outside to the linkage parts;

DETAILED DESCRIPTION OF THE INVENTION

Figure 1:
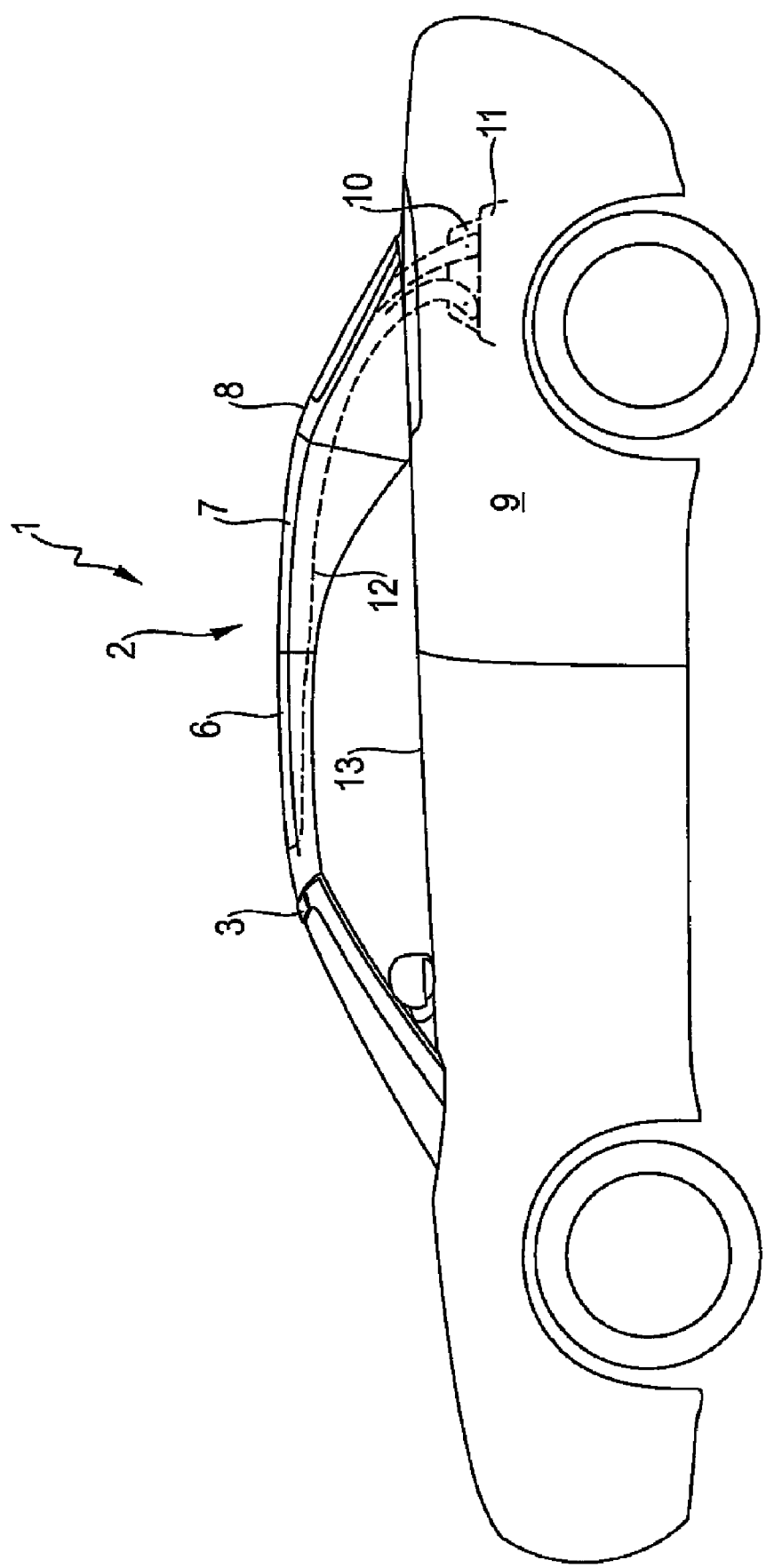
FIG. 1 is a side view of a convertible vehicle according to an embodiment of the present invention with a closed roof with linkage parts and lateral main support units of the roof shown as dashed lines.
Figure 2:
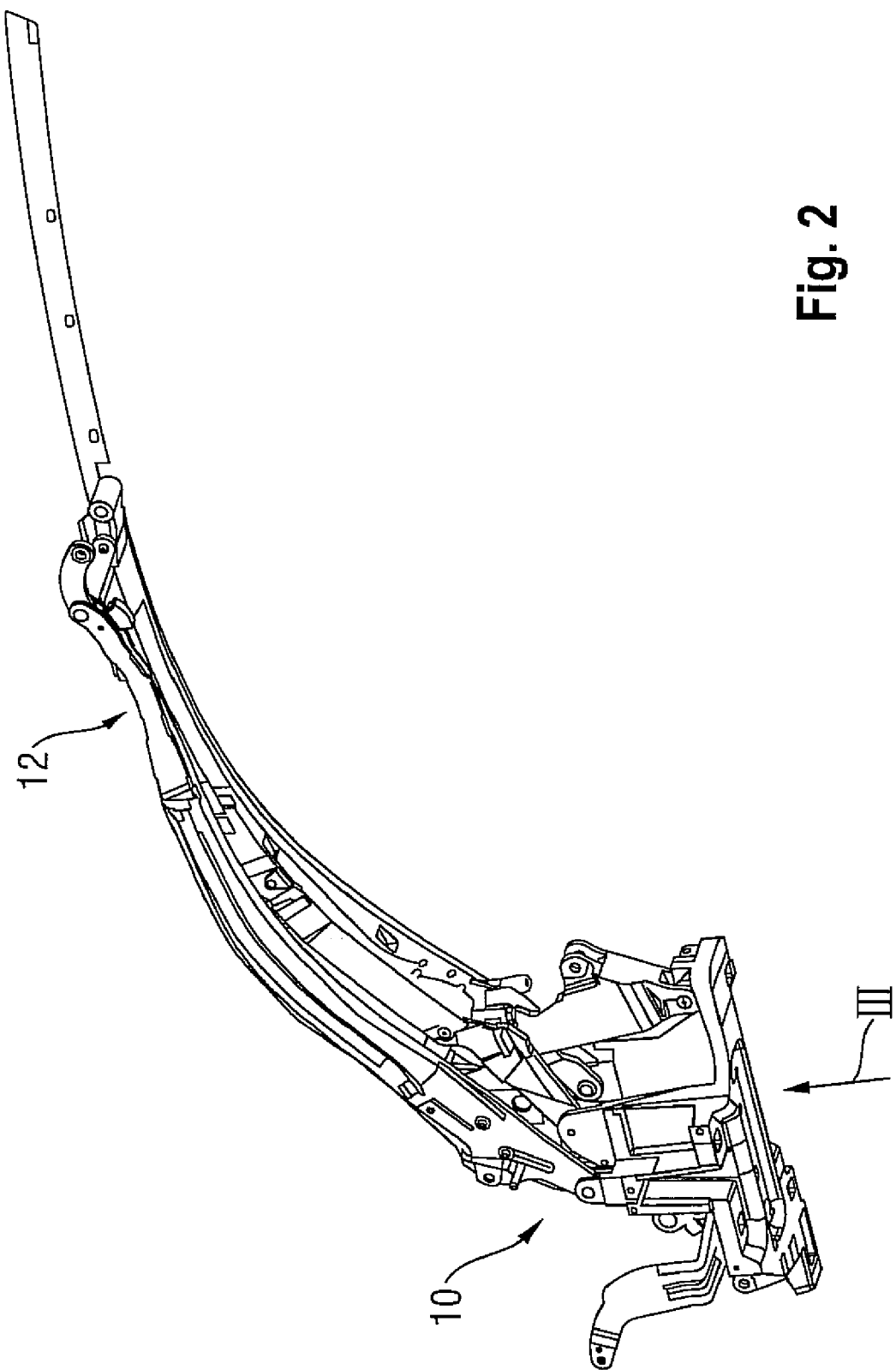
FIG. 2 is a perspective view of the lateral linkage with the lateral main support unit, with the linkage parts shown in a full extended position to replicate the closed roof position of the convertible vehicle.

The convertible vehicle 1 in accordance with the invention can be a four-seater vehicle, a vehicle with multiple seats provided with at least one rear bench, or a two-seater.

The roof 2 is movable overall and adjoins a windshield frame 3 indirectly or directly in the closed position. The roof may be a retractable hardtop (RHT) with a plurality of assemblies mutually separated at their outer surface and made more or less in plate shape, or what is commonly referred to as a soft top covered with a common flexible covering. The roof may include a common covering 5 or a plurality of individual rigid plate parts 6, 7, 8, either of which are supported by roof linkage parts 12 of the same type, as is shown by way of example in FIG. 1.

The vehicle 1 also includes two lateral main support units 10 each having a support body. The lateral main support units are disposed on opposite sides of the vehicle body and fixed thereon by the support body to mounts 11 on the body. The mounts, which may be a console type, movably attach the roof 2 to the rear vehicle region.

Figure 3:
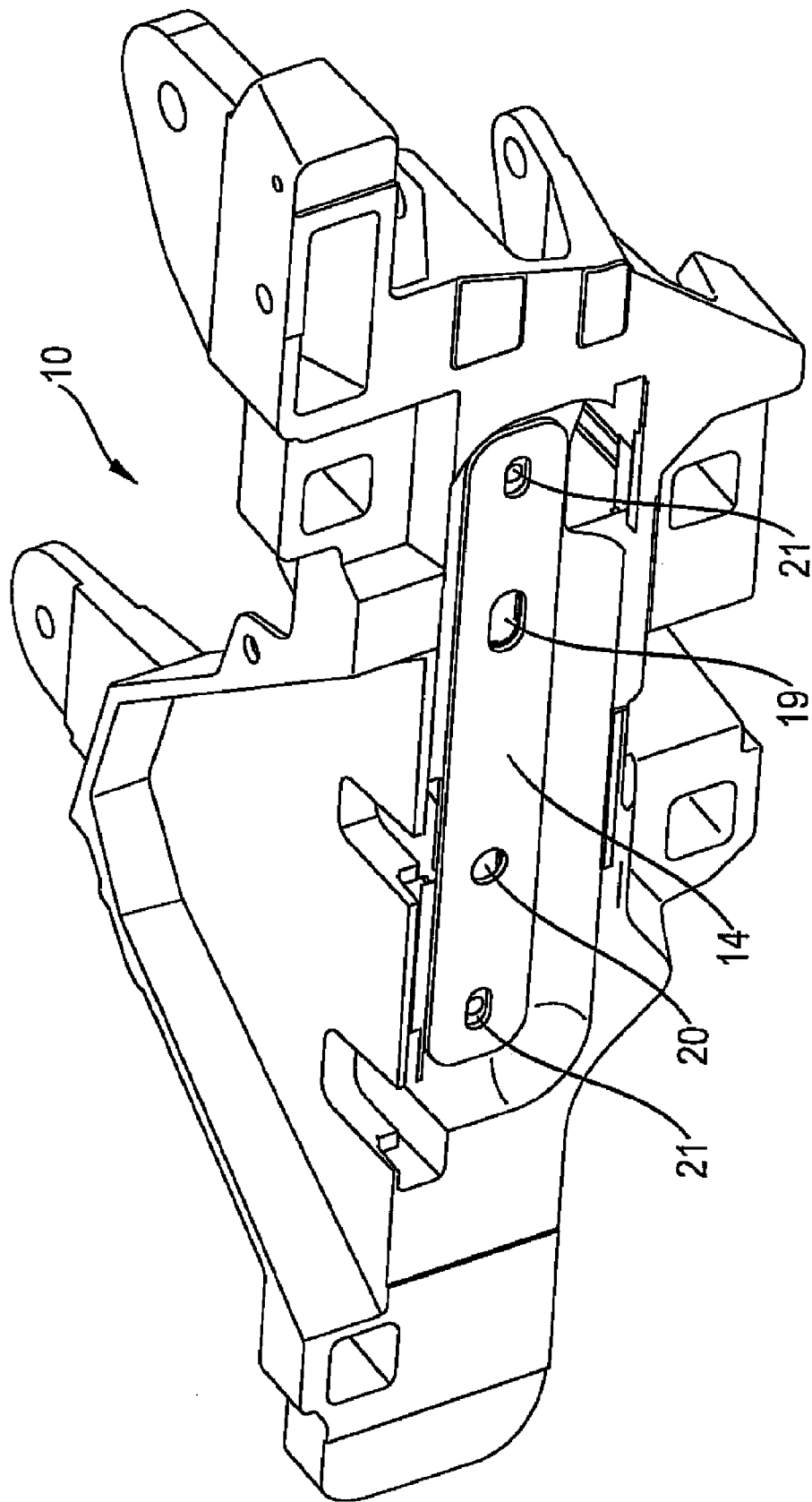
FIG. 3 is a perspective view of the lateral main support unit of FIG. 2 as taken from arrow III of FIG. 2.
Figure 4:
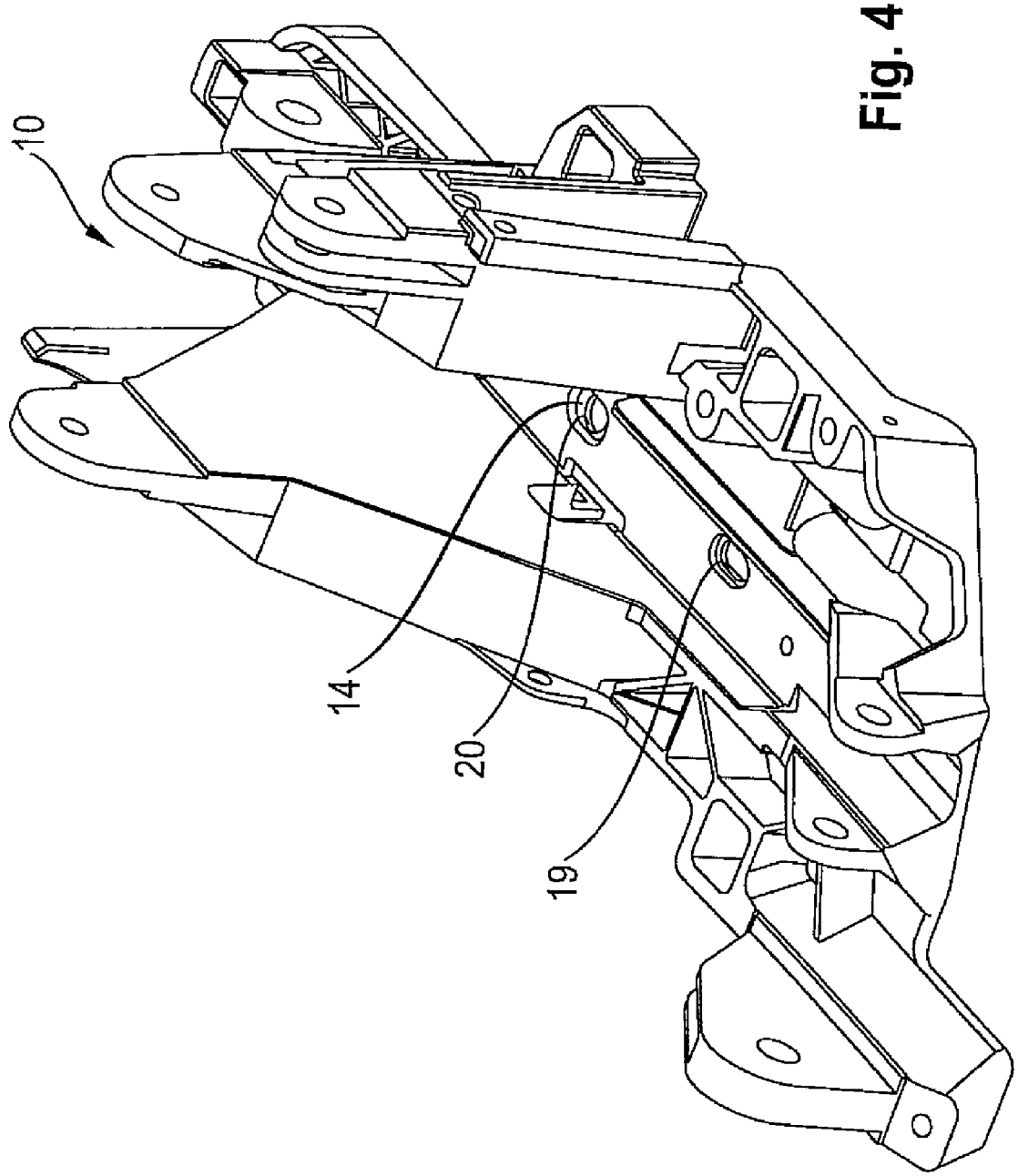
FIG. 4 is a perspective view of a lateral main support unit with the adjustable fastening flanges.

Linkage parts 12 are disposed above the window belt line of the vehicle and extend from the mounts 11 as indicated by the dashed lines in FIG. 1. Each lateral main support unit 10 is provided with at least one fastening flange 14 (FIG. 3) for holding the lateral main support to the body 9. This fastening flange 14 is alignable with respect to the lateral main support unit 10 and holds the lateral main support units by mounting the units to the mounts 11 of the body 9 in the aligned position.

The alignment can relate to a plurality of directions, with the direction parallel to the longitudinal direction of the vehicle—and thus parallel to the largest extent of the roof 2—being of particular importance.

Figure 7:
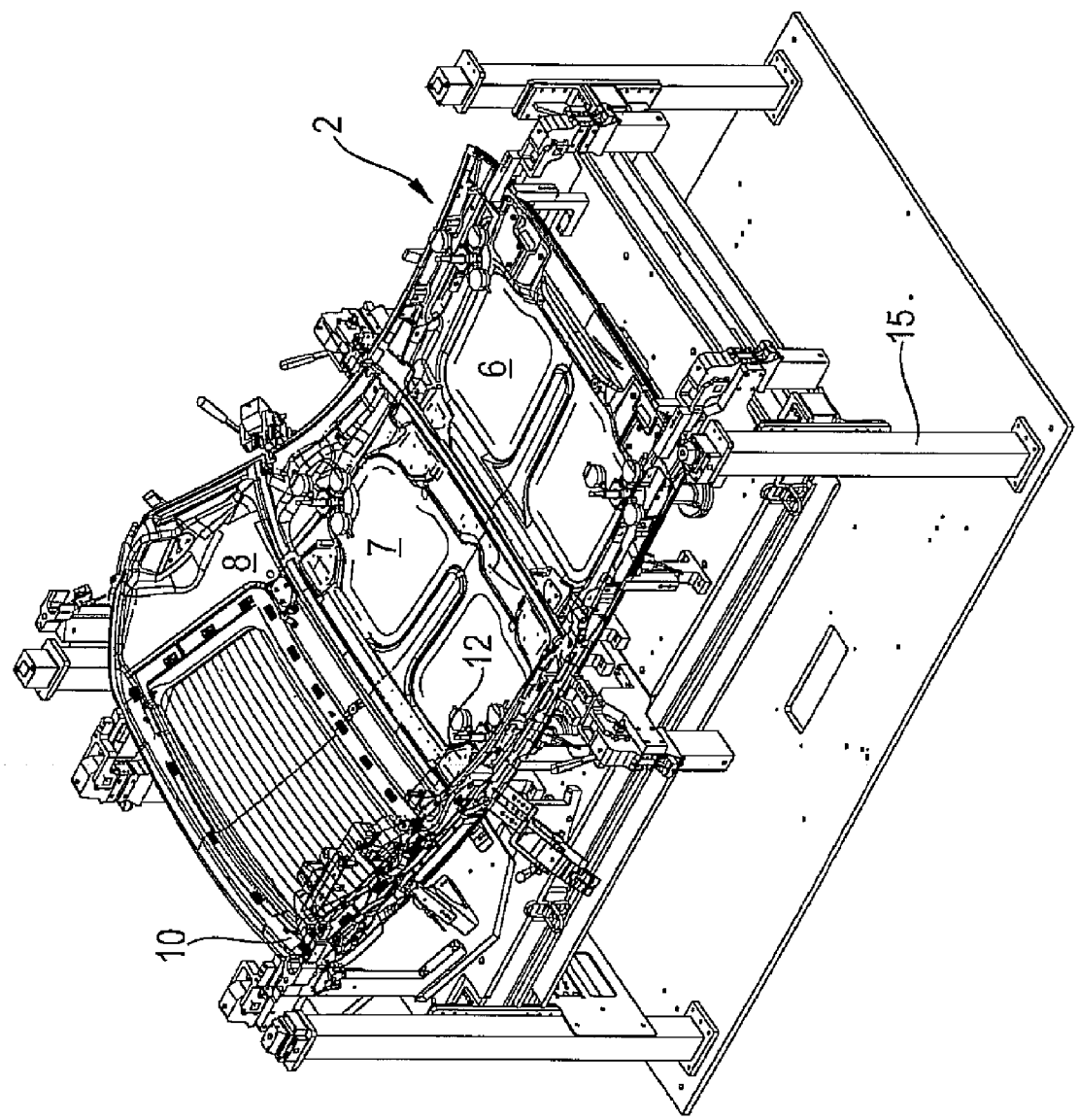
FIG. 7 is a view of FIG. 6 disposed upon a lower tool frame.

In order to align the fastening flanges 14 along each of the lateral main support units 10 during the manufacturing process of the roof 2, the outer shell parts 6, 7, 8 of the roof 2 are first inserted and adjusted in a lower tool frame 15 in a position turned upside down. Linkage parts 12 are likewise turned upside down and at least provisionally fastened to the lateral main support units (FIG. 7). The positioning of these linkage parts 12 starts at their front ends which extend out of the lateral main support units 10 and with which they engage outer shell parts 6, 7, 8. The lateral main support units 10 are upside down and face upwardly (FIG. 7) so that the fastening flanges 14 can be aligned with respect to the support units and can be fixed thereto in an aligned position.

For this purpose, an upper tool frame 16, (FIG. 8) is lowered onto the lower tool frame 15 equipped with the roof 2.

Pins 17, 18 are arranged on the upper tool frame 16 and extend substantially downwardly. The pins 17, 18 cooperate with the fastening flange 14 and move and align it with respect to the support body.

Figure 8:
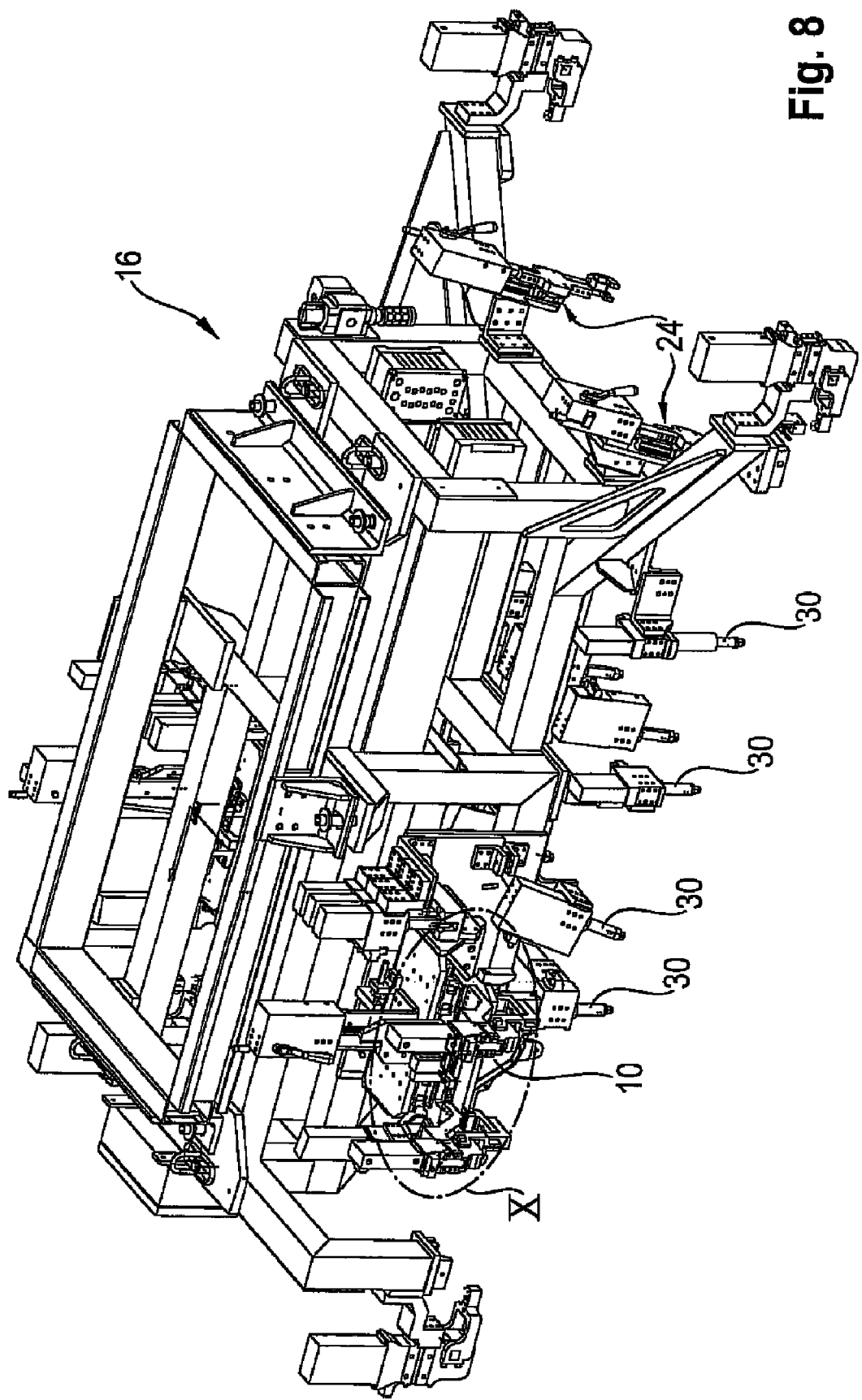
FIG. 8 is a perspective view of an upper tool frame which can be lowered onto the production tool of FIG. 7 from above thereby adjusting the lateral main support unit, with the lateral main support unit shown fixed to the tool frame for a more simple orientation.
Figure 9:
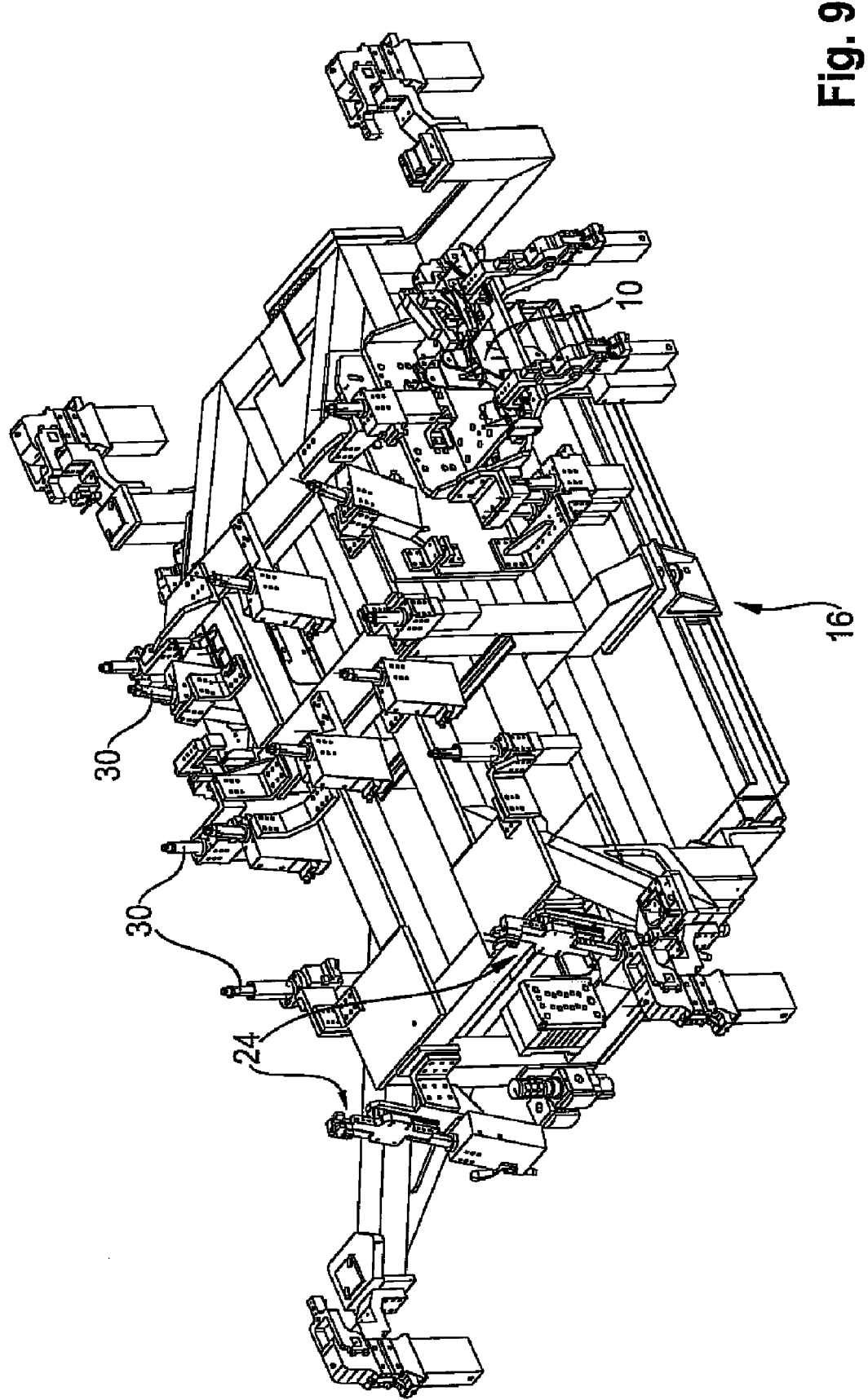
FIG. 9 is a perspective view of the upper tool frame of FIG. 8 turned upside down.
Figure 10:
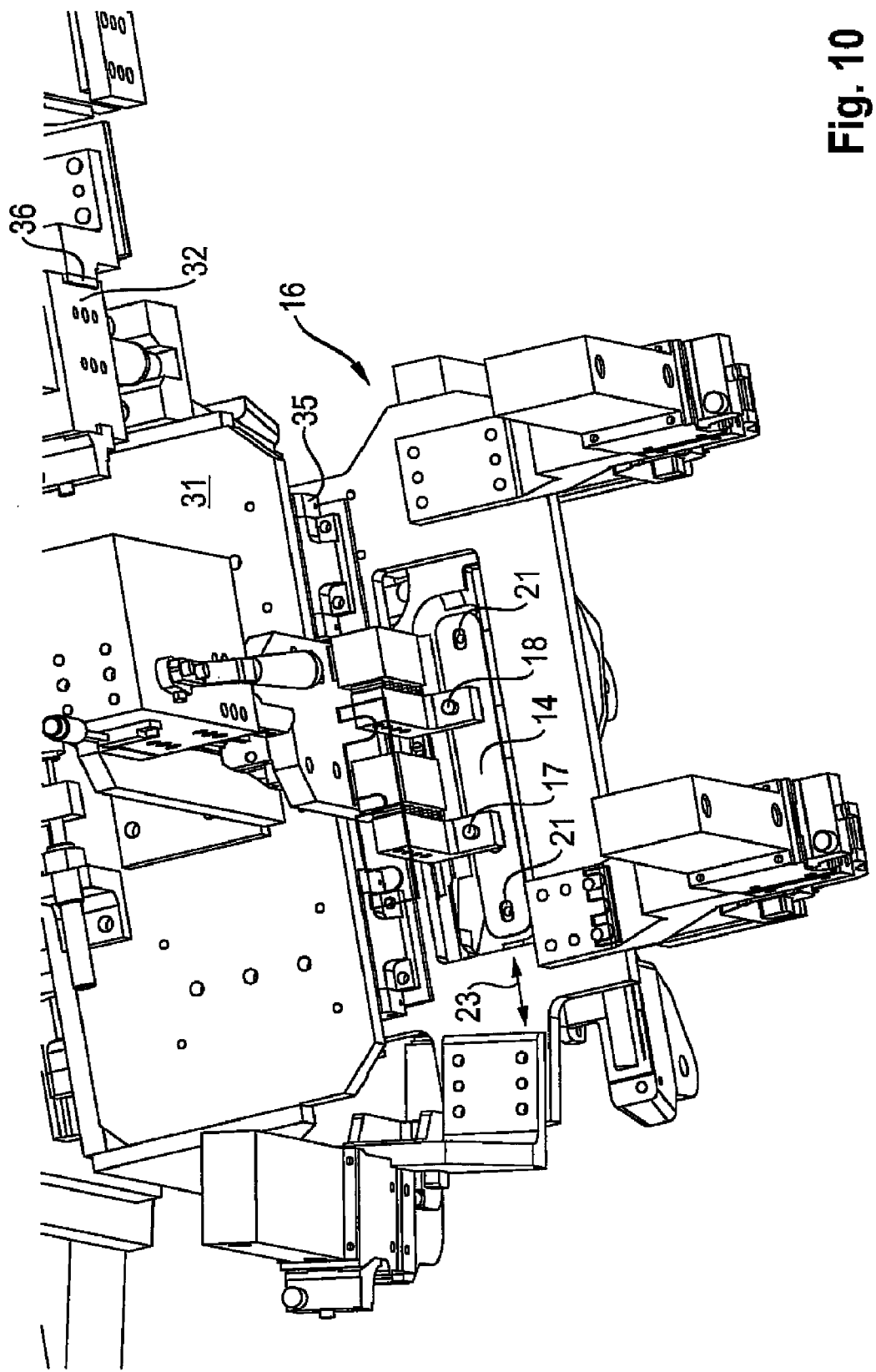
FIG. 10 is a detailed view of the upper tool frame showing the downwardly engaging pins for the alignment of the fastening flange of a lateral main support unit in an engaged position approximately corresponding to the section "X" in FIG. 8.

In FIGS. 8 and 9, the upper tool frame 16 is shown in cooperation with the lateral main support unit 10 without the linkage parts 12. This representation is only to provide a better overview. In reality, the assembly of the linkage parts 12 and the lateral main support units 10 to the roof parts shown in FIG. 7 is carried out so that the upper tool frame 16 lowers onto this assembled unit.

When the upper tool frame 16 is lowered, its pins 17, 18 engage into alignment openings (definition holes) 19, 20 of the movable fastening flange 14, with at least one of these openings 20 being shaped to fittingly receive a registered pin on the upper tool frame 16. The other opening is shaped as an elongated hole to avoid an over determination. Accordingly, the openings work in concert with the upper tool frame pins whereby one opening fittingly holds the lateral main support unit in position while the other opening provides production tolerance to the lateral main support unit.

Figure 11:
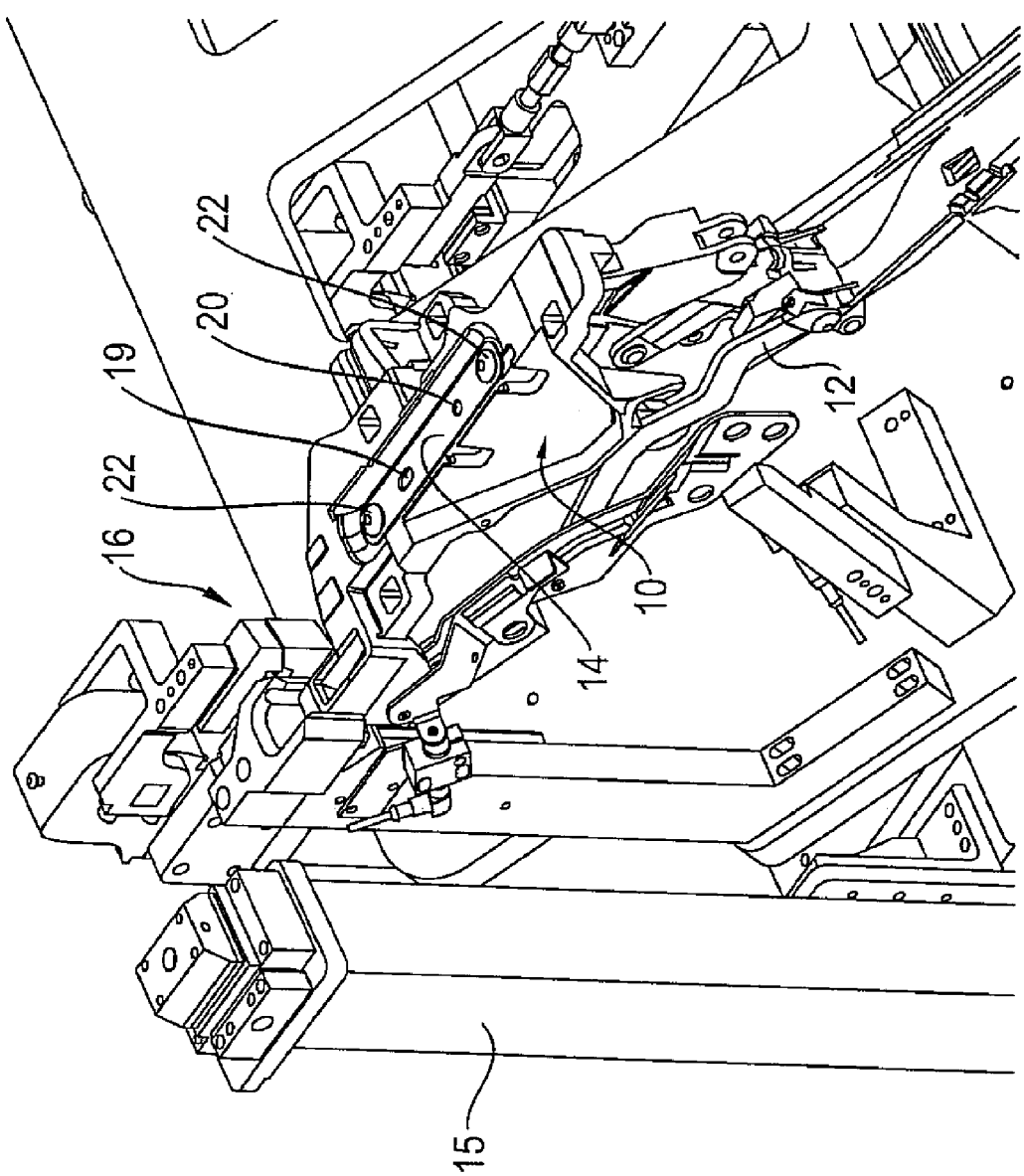
FIG. 11 is a perspective detailed view taken from above of the fastening flange, whereby the fastening flange has yet to be fixed to the lateral main support unit.
Figure 12:
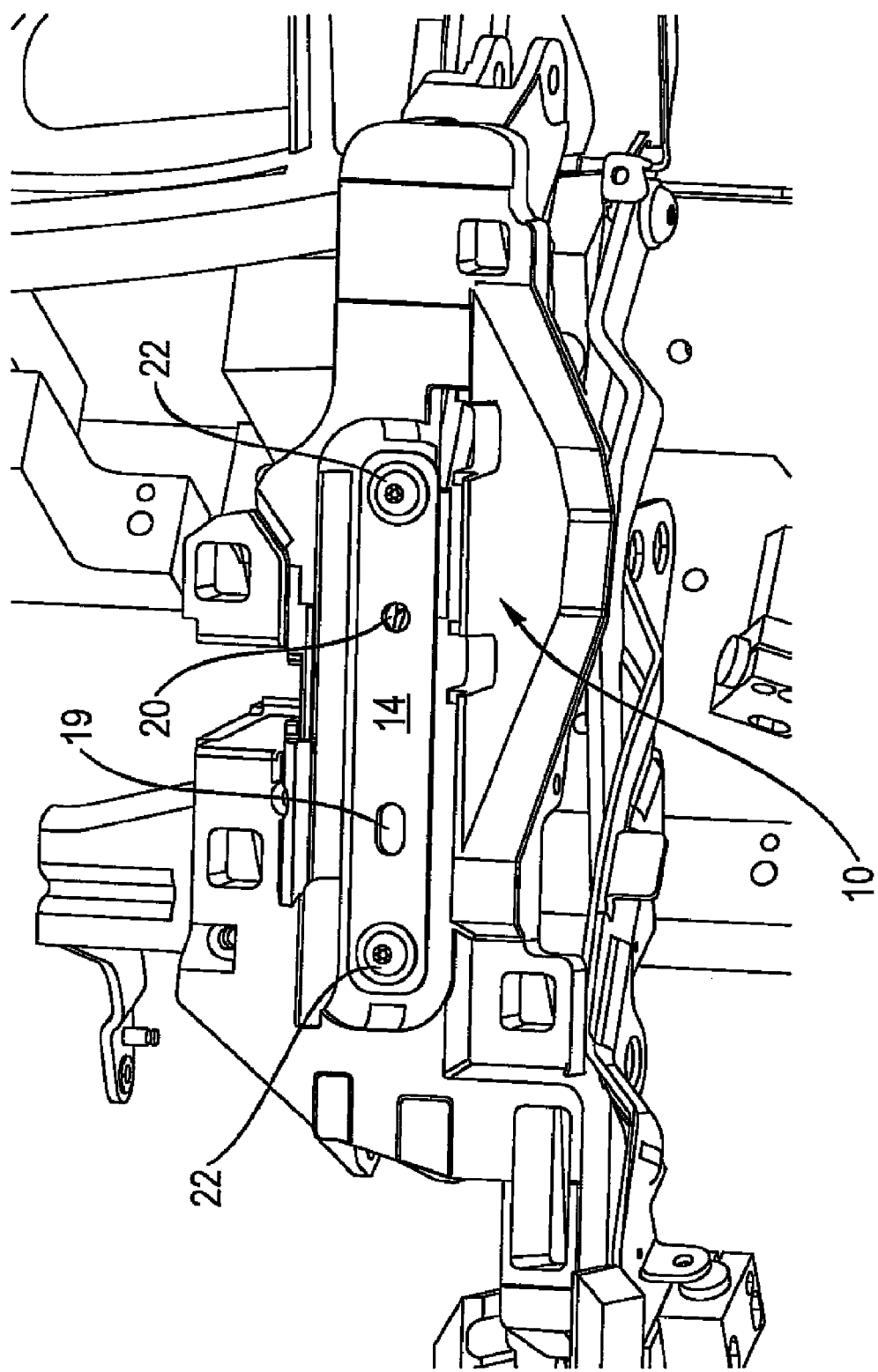
FIG. 12 is a planar view of the parts of FIG. 11.
Figure 12A:
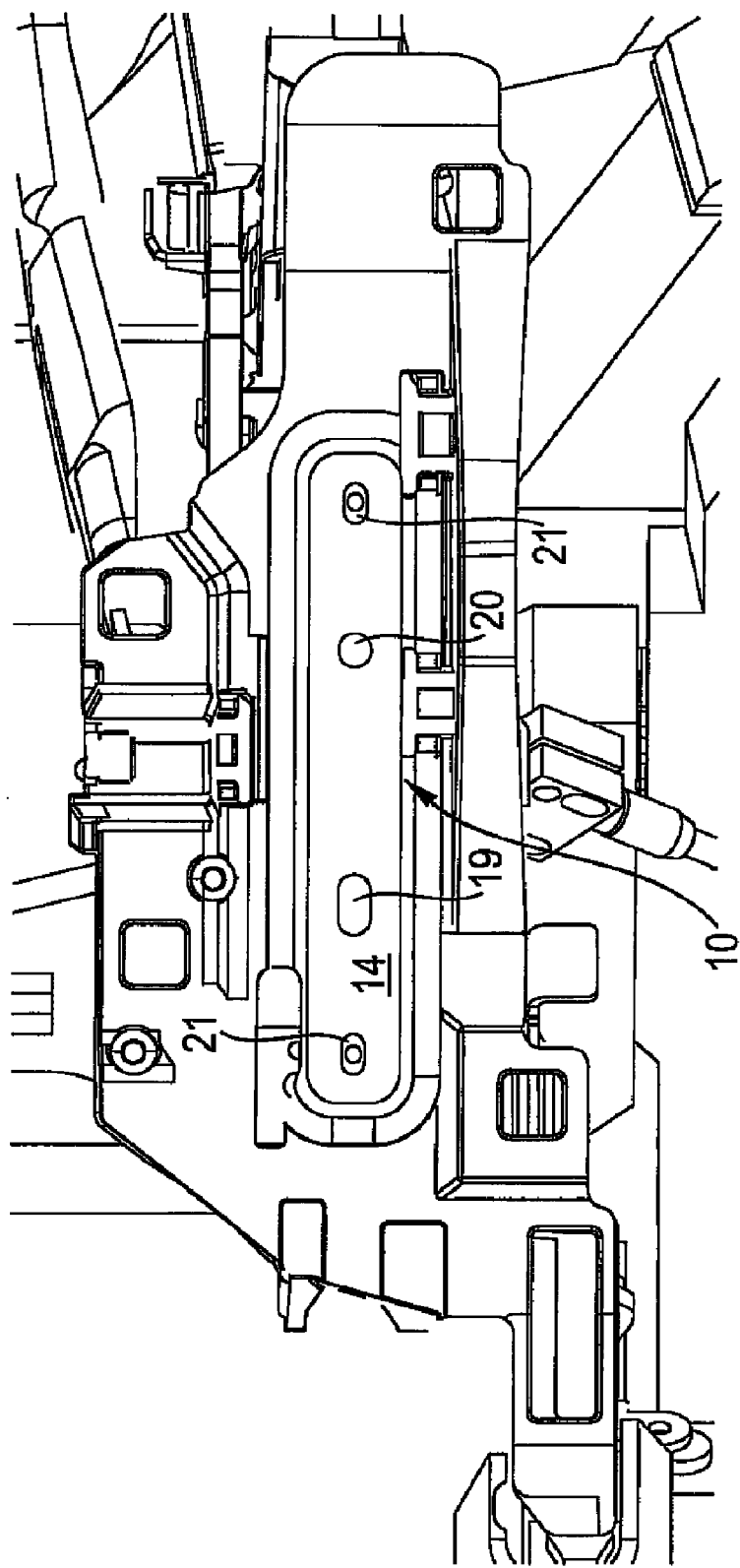
FIG. 12a is a similar view to FIG. 12 whereby the fastening flange has yet to be fixed to the lateral main support unit.
Figure 13:
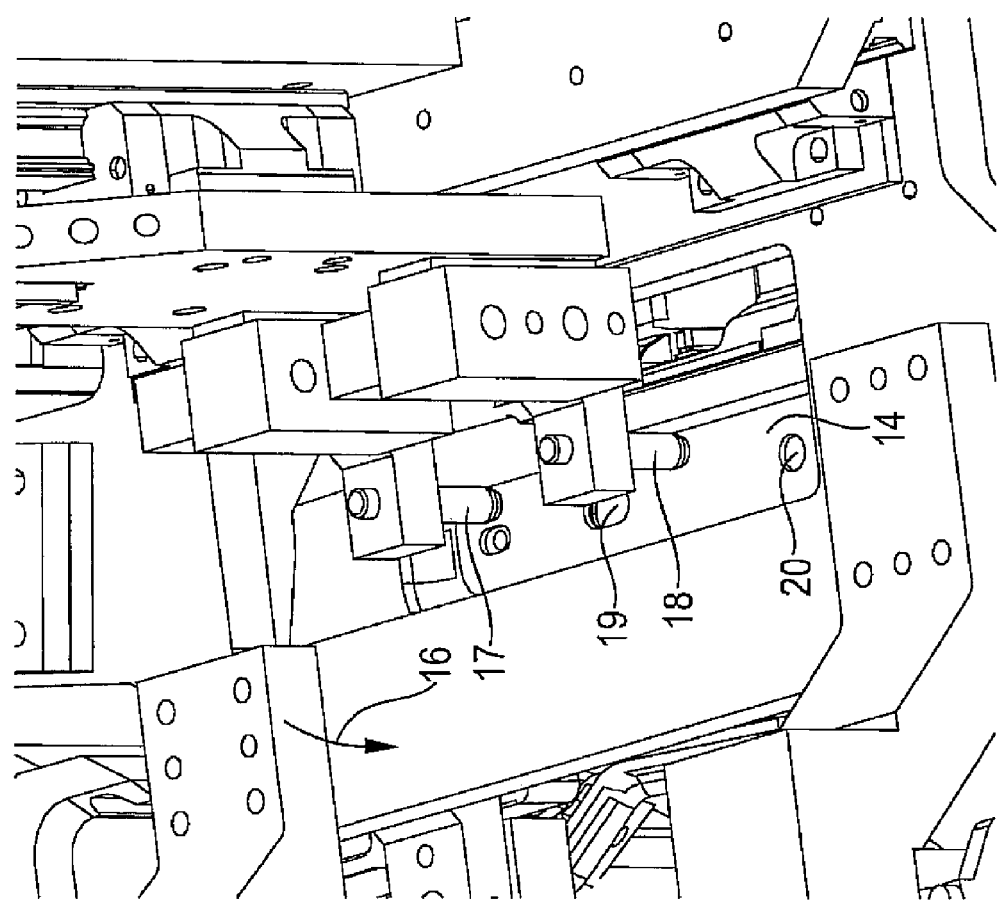
FIG. 13 is a perspective view of the fastening flange taken from above whereby the fastening flange is ready to receive the alignment pins that are disposed on the upper tool frame prior to the lowering of the upper tool frame.
Figure 14:
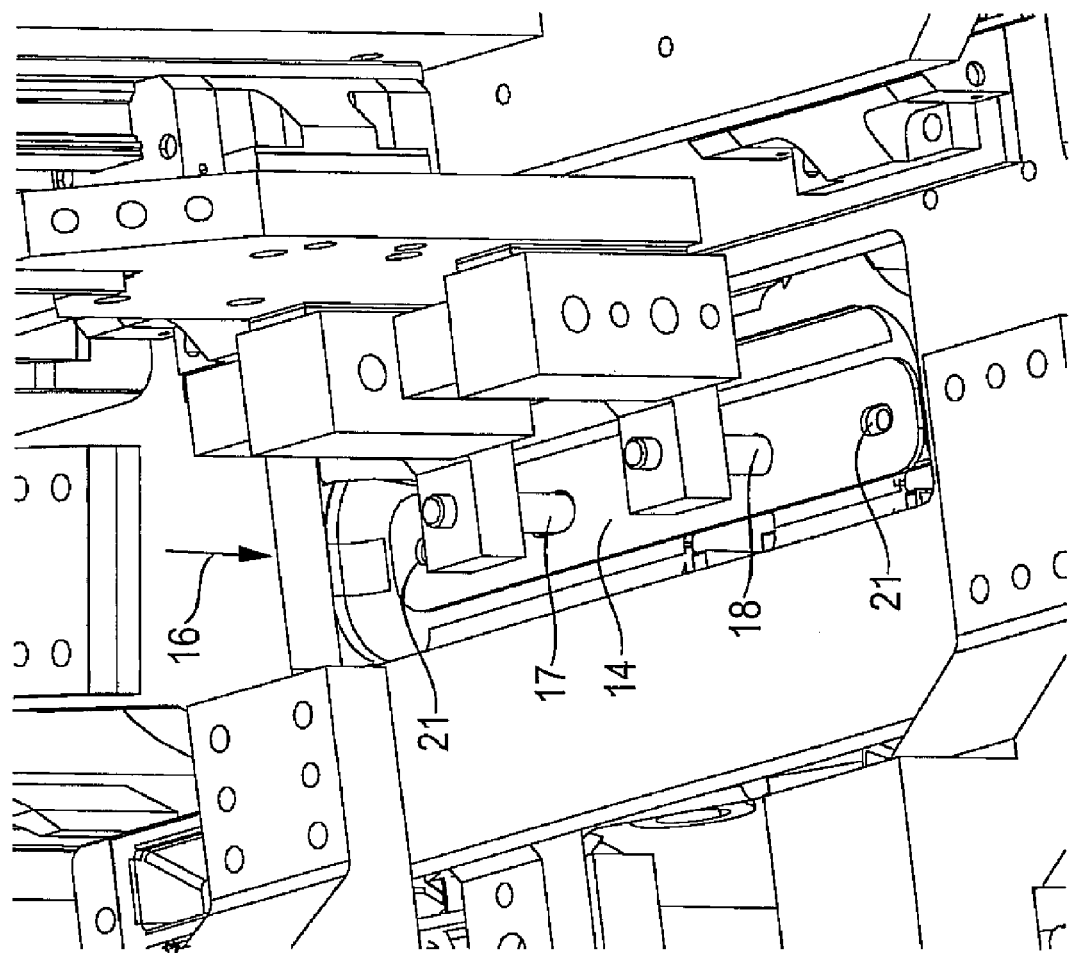
FIG. 14 is a similar view to FIG. 13, but with the alignment pins of the upper tool frame engaging the fastening flange.

The fastening flange 14 also includes longitudinal holes 21 whereby the fastening flanges 14 aligned to the lateral main support unit 10 in the manner described above can be subsequently fixed to the lateral main support units 10 using fasteners 22 (FIG. 11). Specifically, the fasteners extend through the longitudinal holes 21 and engage bores disposed in the lateral main support unit.

The lowerable upper tool frame 16 includes adjustment and fixing means disposed on the end of the upper tool frame which engages the forward portion of the roof with respect to the orientation of the vehicle. The adjustment and fixing means project downwardly from the upper tool frame with respect to the lower tool frame 16 and cooperate with the foremost roof part 6 when lowered thereon to enable the exact fitting of roof closures 25 associated with the roof tip, for example hooks or hoops. The spacing between the rear pins 17, 18 and the front adjustment and fixing means 24 is always the same. This results in a finished roof 2 with consistent spacing between its rear fixing at the mounts 11 of the body and its closures 25 at the windshield frame 3.

These additional front adjustment and fixing means 24 can again include, for example, downwardly projecting pins—also in a conical design—and also a device for screwing in screws.

Figure 5:
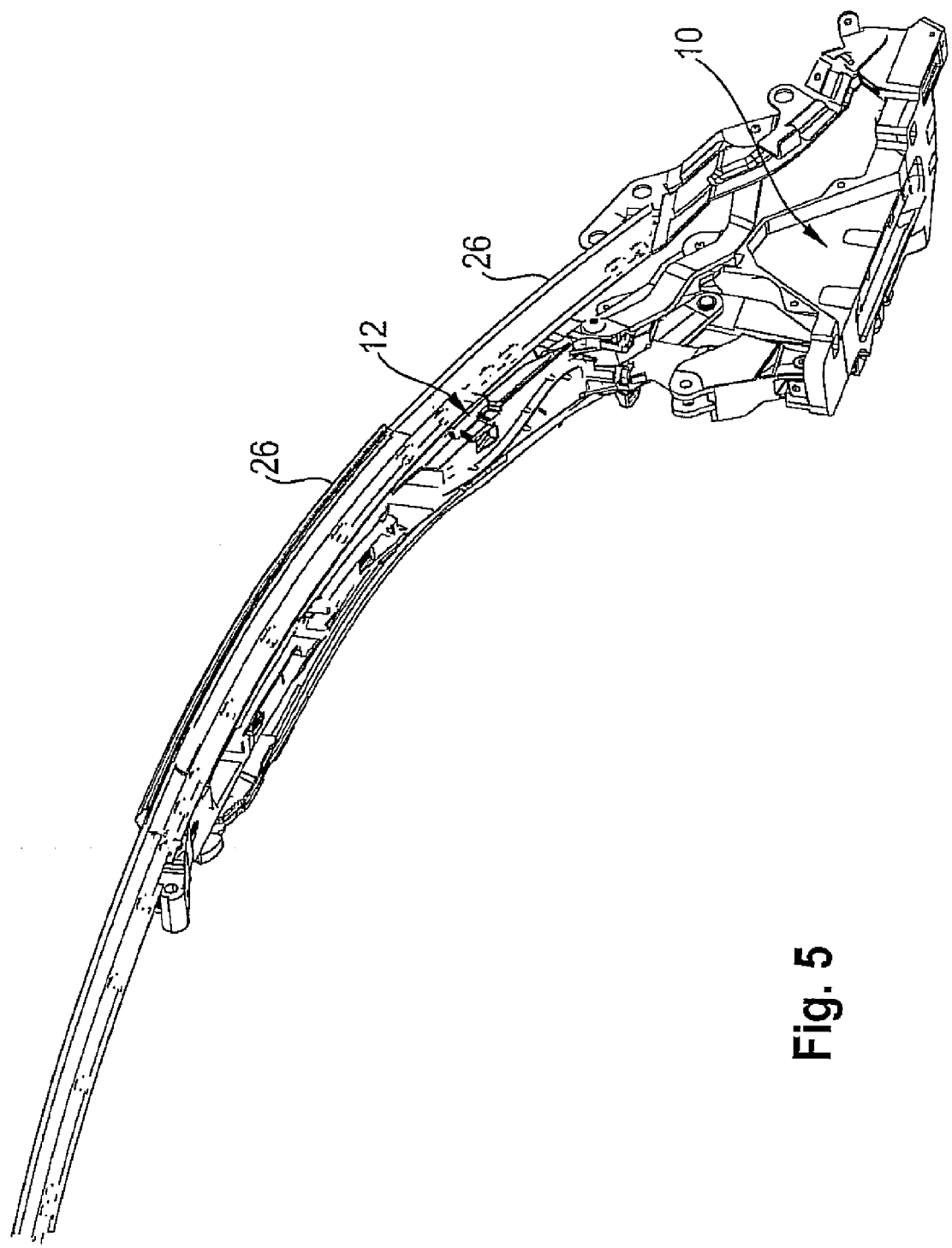
FIG. 5 is a different perspective view of FIG. 2.
Figure 6:
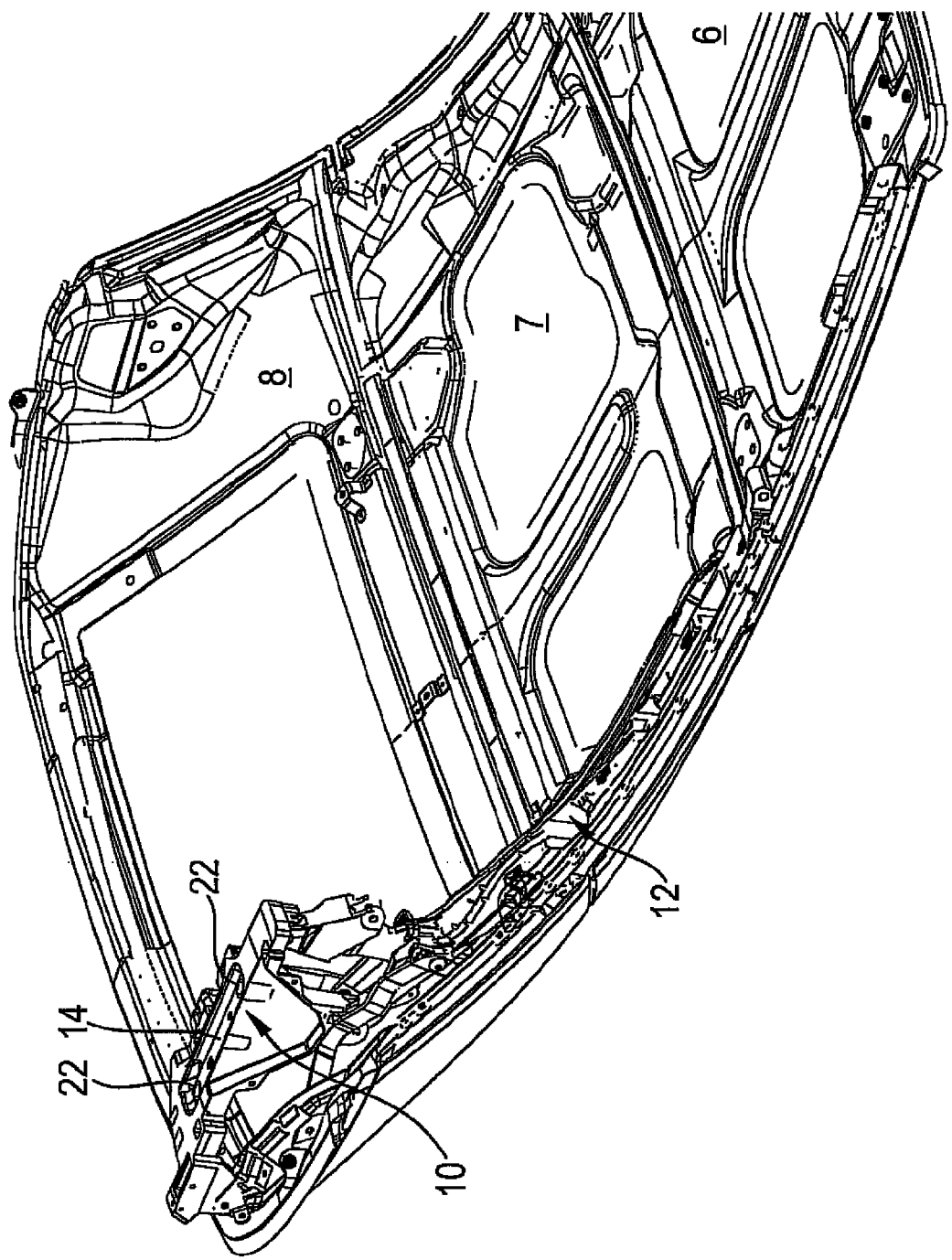
FIG. 6 is a perspective view of a lateral main support unit with linkage parts extending therefrom, and the associated roof parts disposed upside down during the production of the roof.
Figure 20:
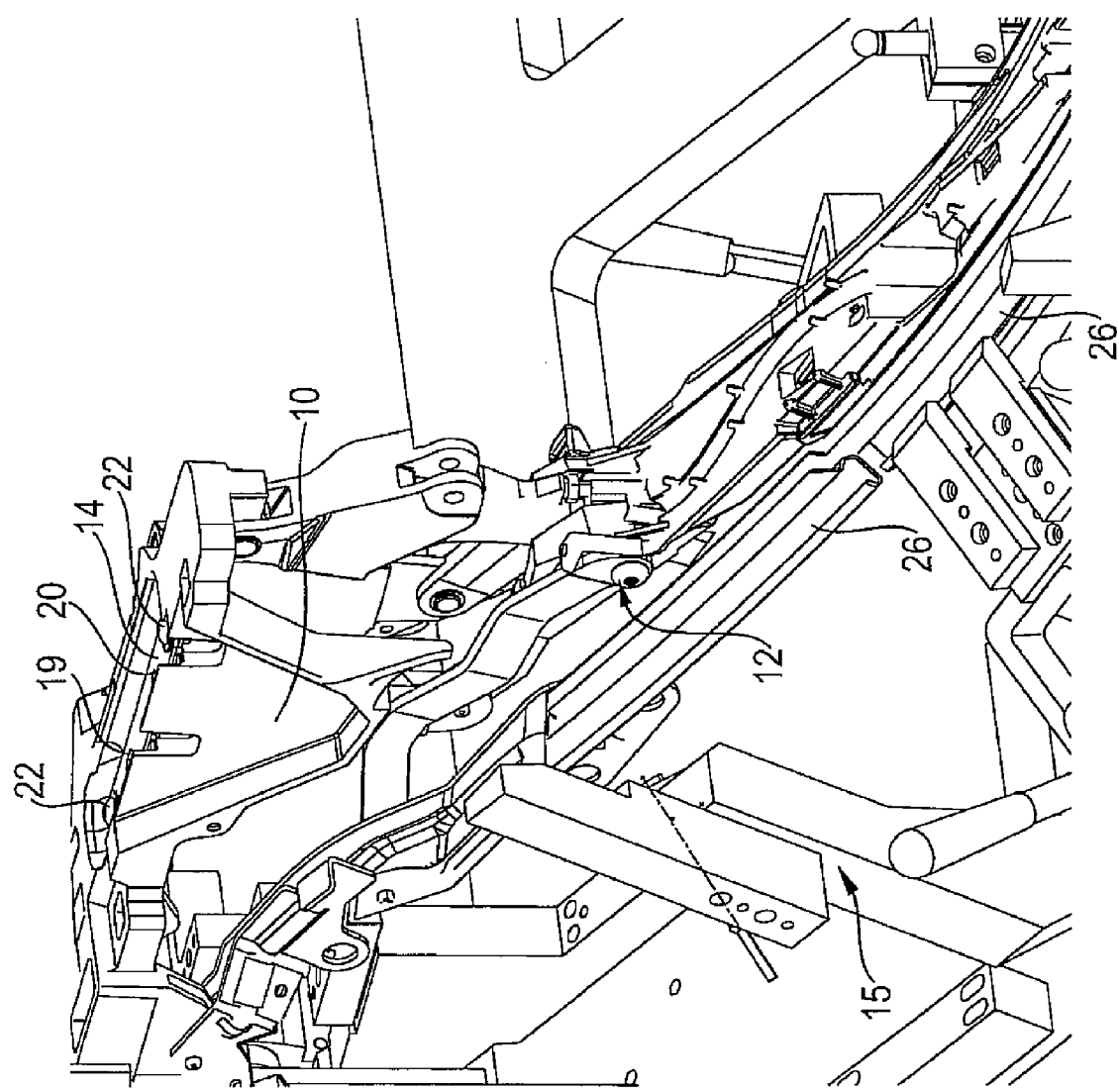
FIG. 20 is a perspective view of the rear part of the linkage showing the assembly of lateral sealing rails.
Figure 21:
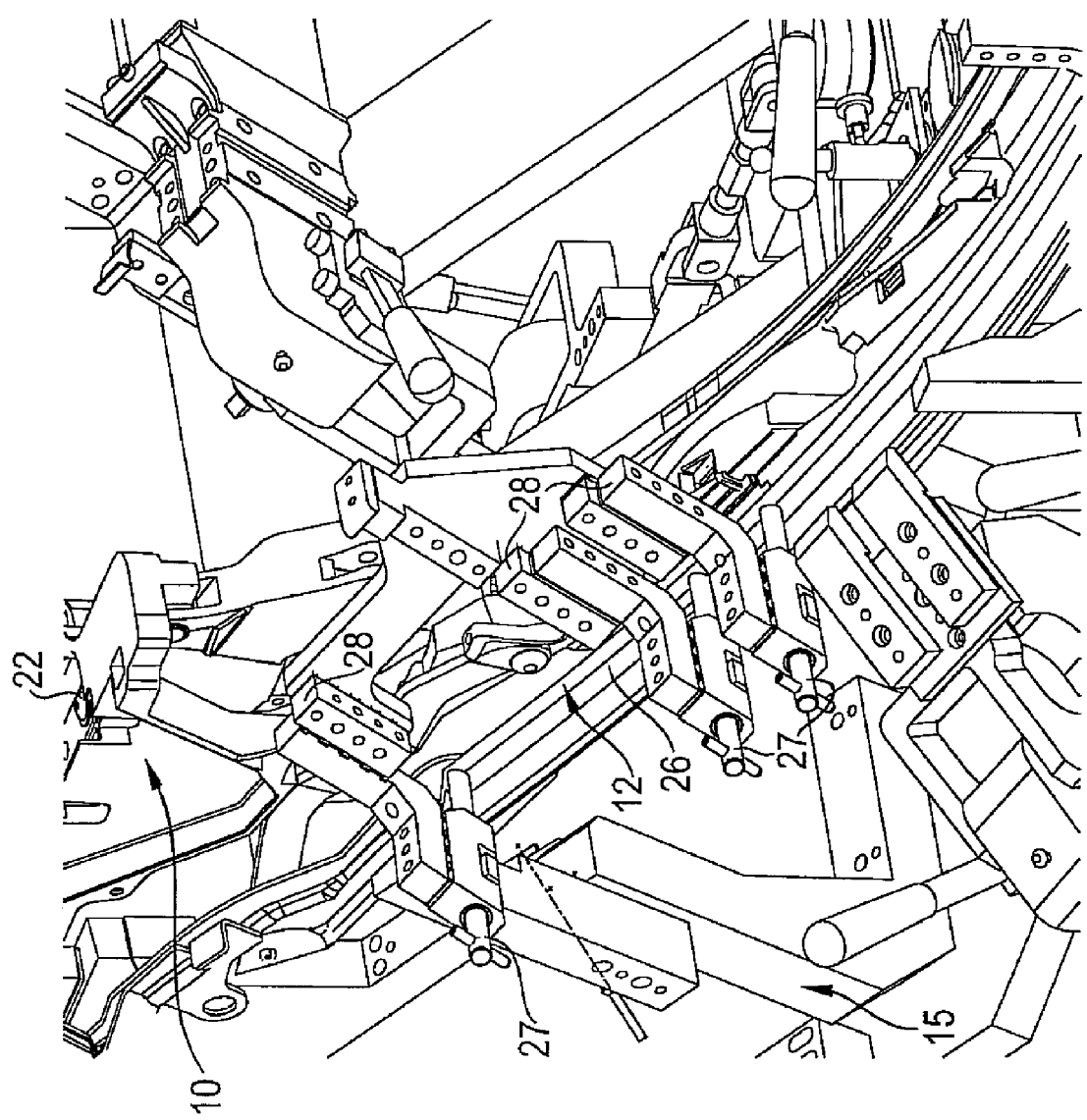
FIG. 21 is a perspective view of the region shown in FIG. 20 showing the means for fixing the sealing rails.

As shown in FIGS. 20 and 21, lateral sealing rails 26 can additionally be mounted to the transverse edge of the roof 2 using the same upper tool frame or using a further upper tool frame in its lowered position. The upper tool frame 16 is provided with defining mandrels 27, 28 which are operative in different directions and enable a three-dimensional alignment of the sealing rails 26 at the roof edge for the dimensionally precise assembly of these sealing rails. By way of example, FIG. 5a shows three sealing rails 26 which are each to be mounted to the lateral edges of three plate parts 6, 7, 8 and the use of the defining mandrels does not restrict the movability of the outer shell parts 6, 7 and 8 with respect to one another.

It can be seen, for example, from FIG. 8 that the upper tool frame 16 can be provided with downwardly extensible fixing means 30 for the adjustment of the roof parts 6, 7 8 in the lower tool frame 15. The exact alignment of the turned over roof parts 6, 7, 8 in the tool via their upwardly facing inner sides is thus possible, whereby the downwardly facing, and frequently painted, outer sides can be preserved.

Figure 15:
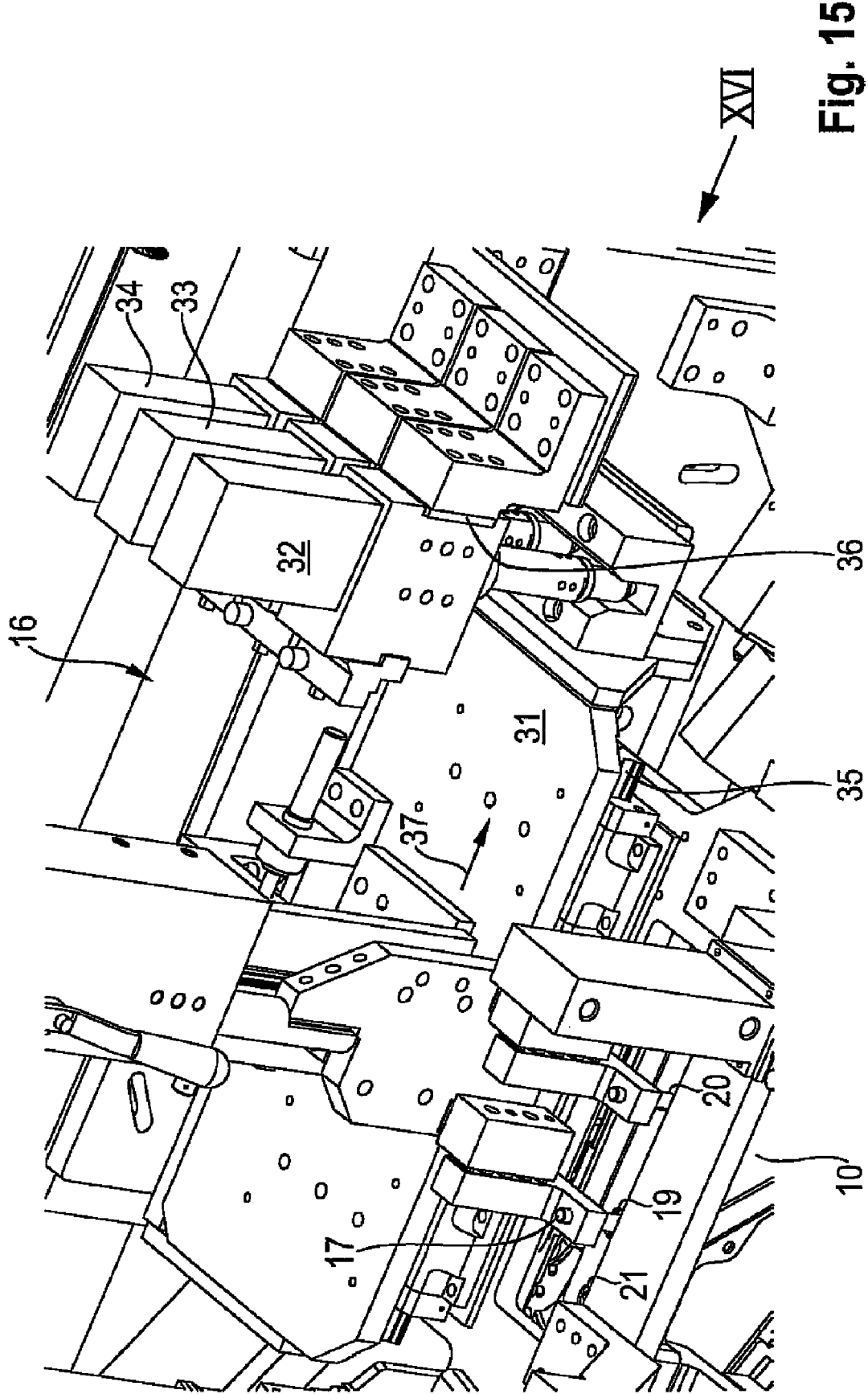
FIG. 15 is a different perspective view of FIG. 10 showing a slide guide for the alignment pins and three adjustment members.
Figure 16:
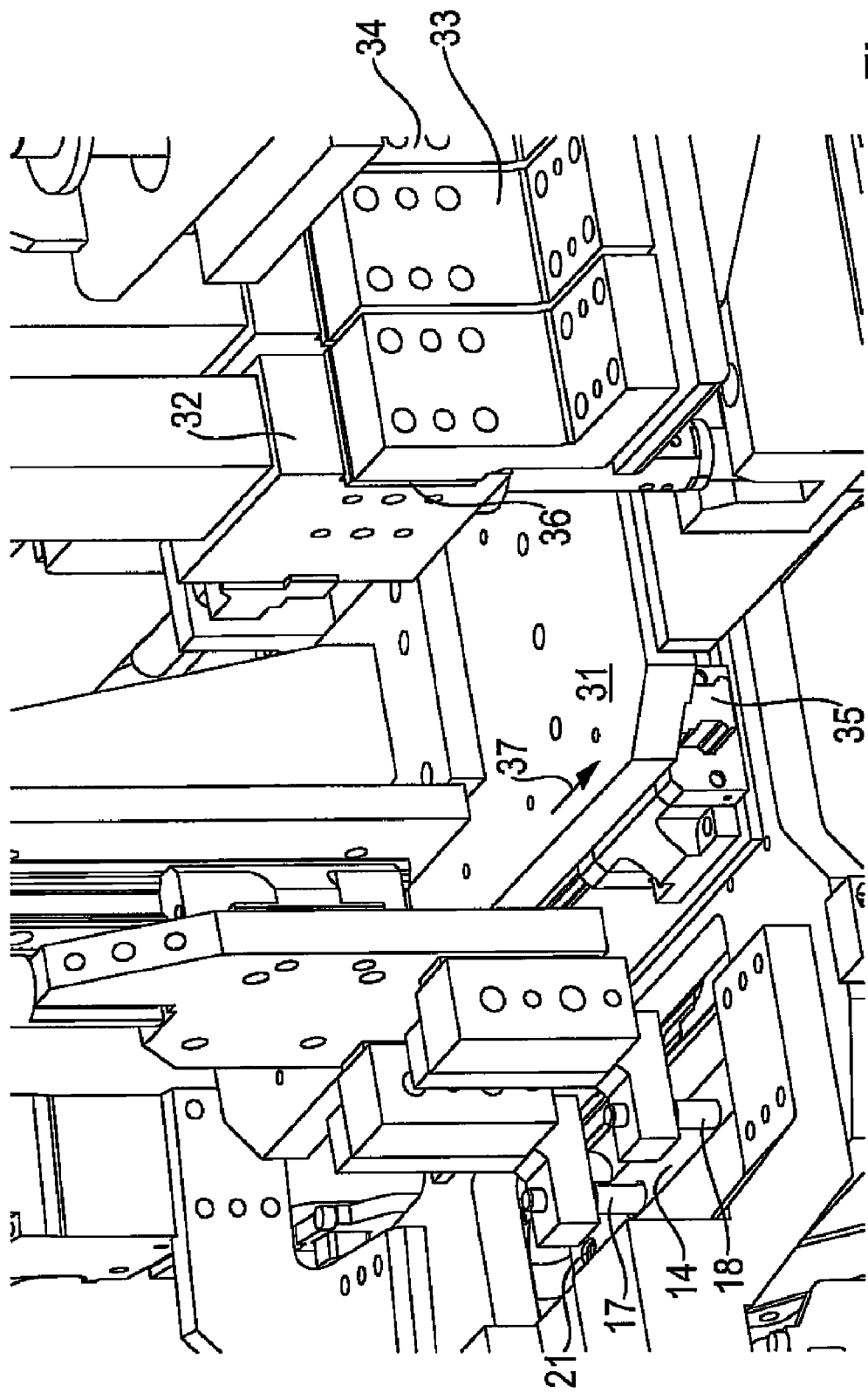
FIG. 16 is another perspective view of the upper tool frame showing the fastening flanges, pins, adjustment members, and shim packs.
Figure 17:
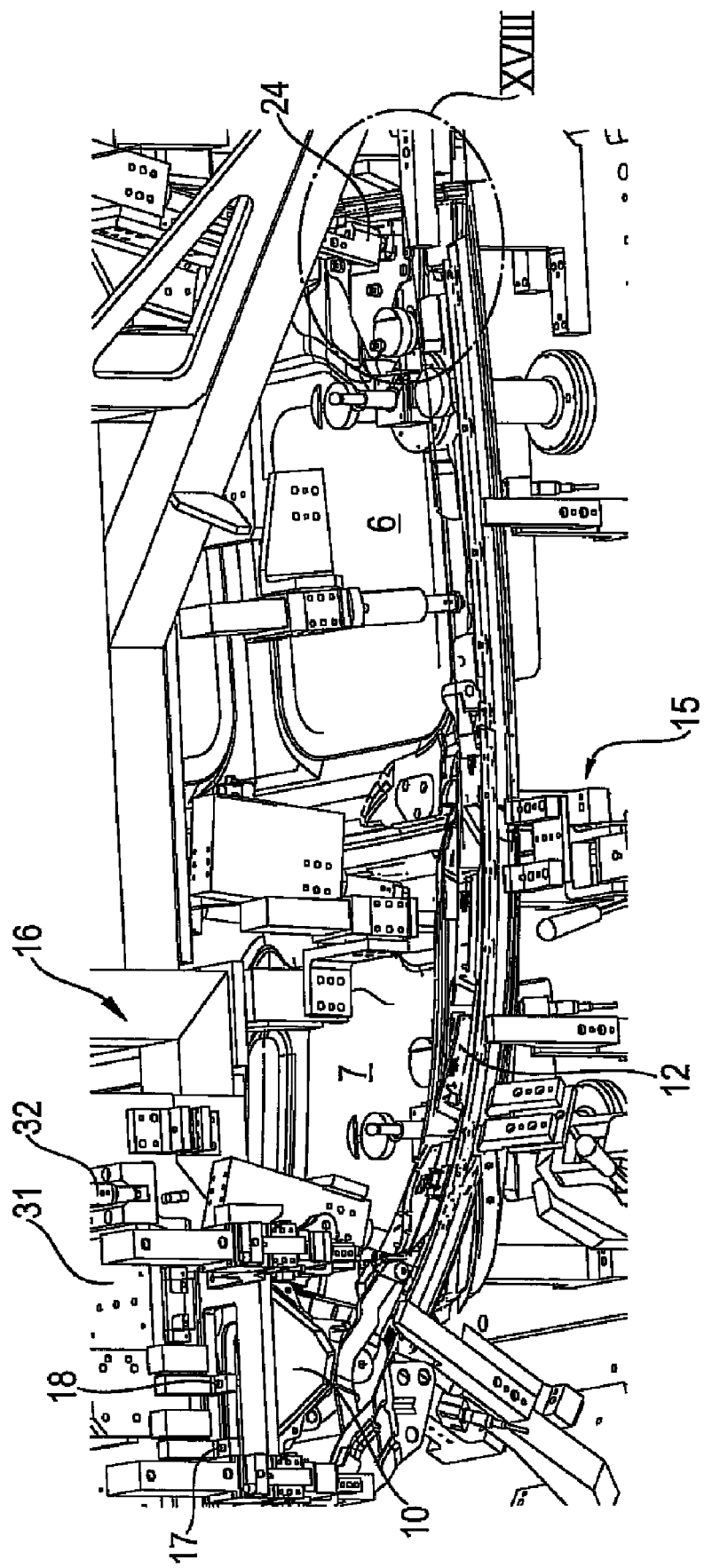
FIG. 17 is a perspective view of the roof parts held in the lower tool frame, the view including the linkage parts mounted thereon, the fastening flange aligned by alignment pins of the upper tool frame and additional fixing means for the precisely fitting assembly of the front roof closures at the roof tip.
Figure 18:
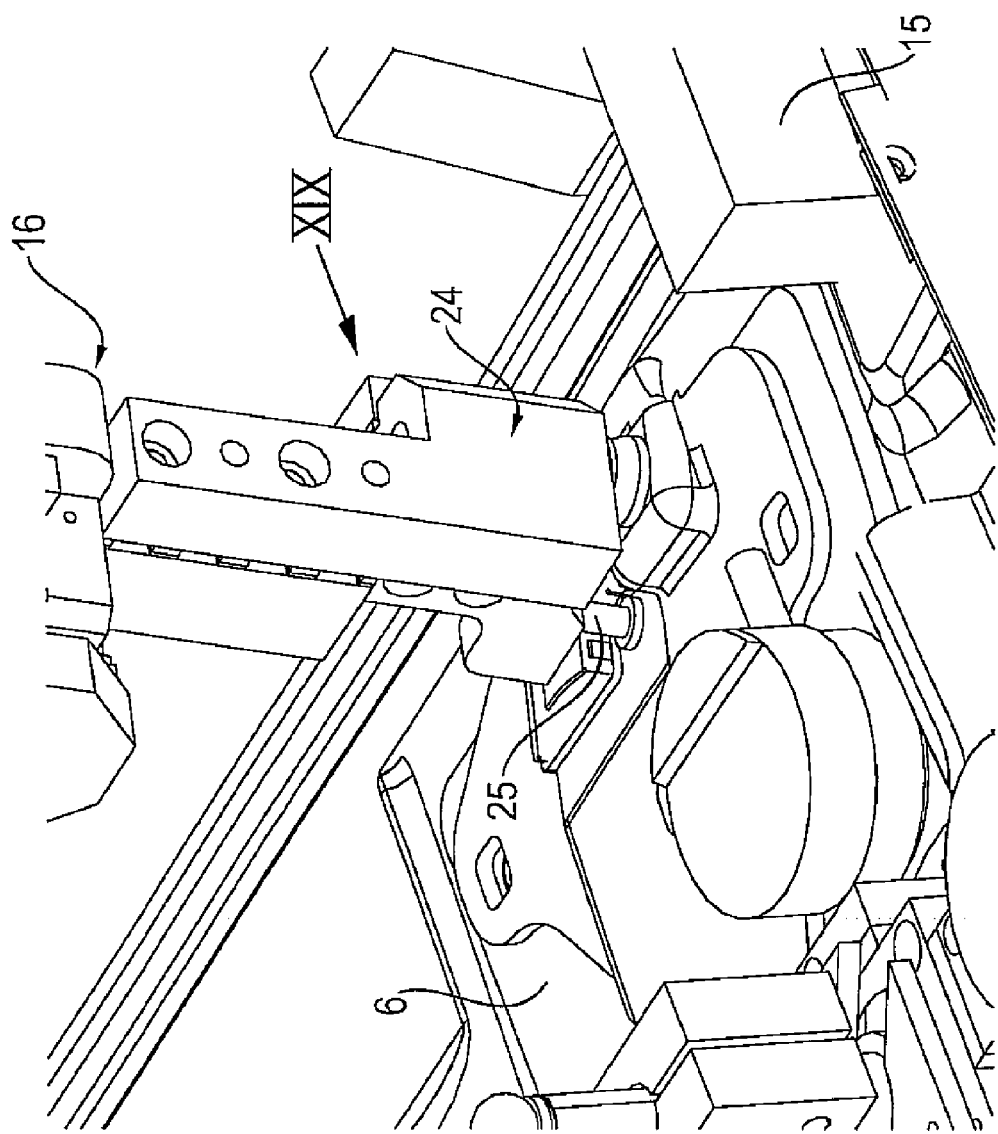
FIG. 18 is a closer perspective view corresponding to the detail XVIII in FIG. 17.
Figure 19:
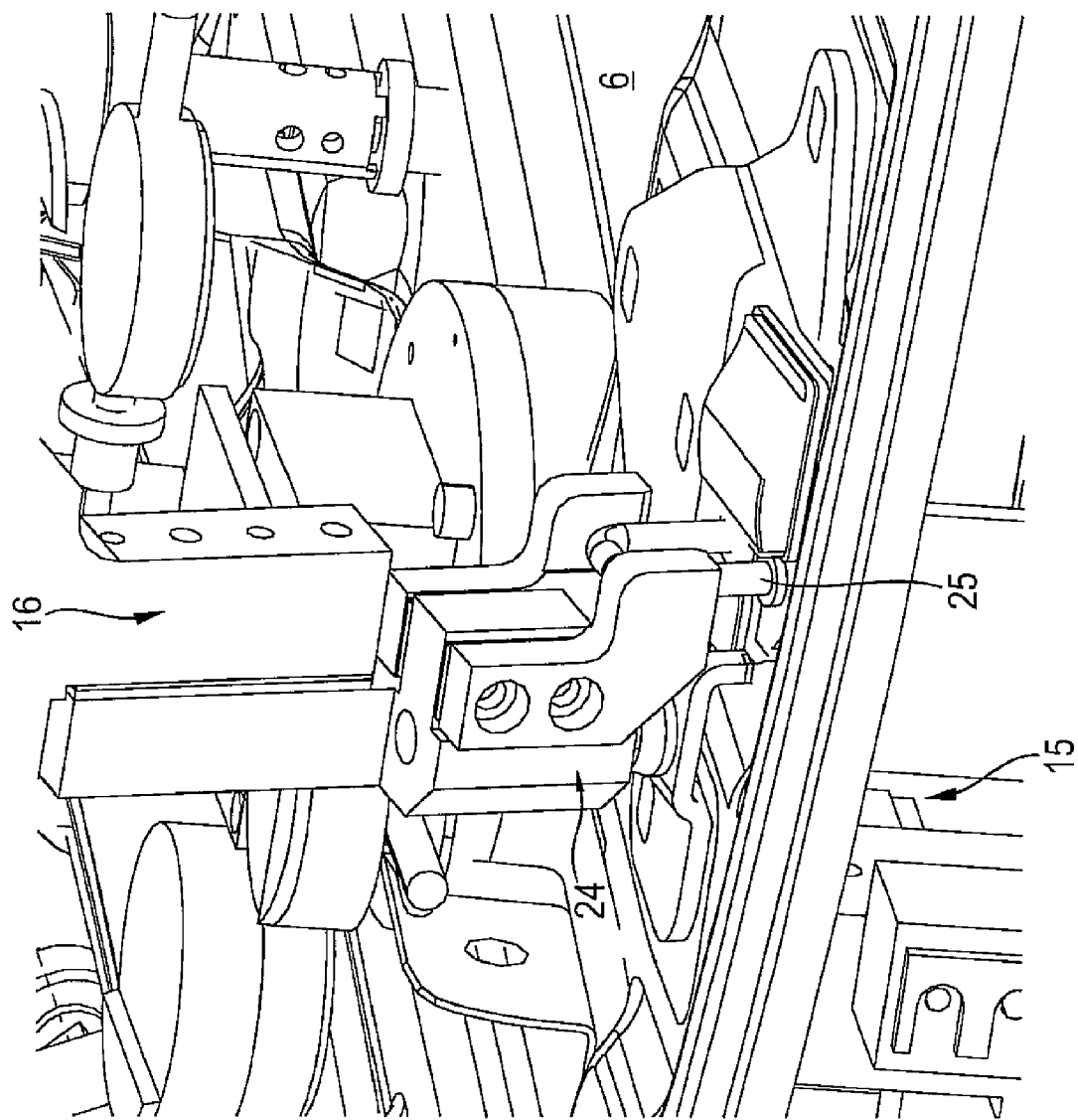
FIG. 19 is a closer perspective view corresponding to the detail XI in FIG. 18.

With reference now to FIGS. 15 and 16, an embodiment is shown here in which the pins 17, 18 aligning the fastening flange 14 are relatively movable with respect to the tool frame 16. In the embodiment shown here, the pins are held by a plate 31 and are displaceable in the longitudinal direction. Different longitudinal spacings can thus vary between these pins 17, 18, and the front fixing and adjustment means 24 for the closures 25 of the roof tip. This enables the manufacture of different roof lengths using the same tool.

Three relative positions of the pins 17, 18 relative to the front adjustment units 24 can be set using three adjustment members 32, 33, 34. The plate with the pins 17, 18 is movable with respect to the longitudinal direction of the roof 2 on a rail 35 for this purpose. A first relative position is provided for a roof 2 with solid roof parts 6, 7, 8 as is shown here. A second relative position can be provided for a roof 2 with a textile covering and a third relative position can be provided for a roof 2 with a vinyl covering. The relative positions are required as each roof type exerts different tensile forces on the roof. For example, a roof with the vinyl covering exerts a stronger tensile force on the roof linkage 12 than the roof with textile covering, and the roof with the textile covering exerts a stronger tensile force than the roof with the solid roof parts. The position of the pins can be set by having the three adjustment members engage the pin plate. For example, when adjusting the position of the pins with regards to a roof 2 with a vinyl covering, adjustment members 32, 33, 34 will shorten the length of the roof 2 by engaging the pin plate thus pulling the plate slightly forward in the direction of the arrow 37. The exact position of the engaging adjustment members 32, 33, 34 with respect to the longitudinal direction of the roof can be fixed, for example, via shim packs 36.

The roof 2 with front closures 25 and aligned fastening flanges 14 on the lateral main support units 10 is turned over and installed onto a vehicle body 9 which has upwardly facing body pins standing analog to the pins 17, 18 of the upper tool frame 16. These body pins, which are arranged on the console 11, can also be transposable with respect to the body via a plate similarly displaceable to the fastening flange 14. This allows the roof 2, which is always the same for any given covering type, to adapt for possible tolerances of the body 9 between the windshield frame 3 and the rear mounts 11.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A method of manufacturing a convertible vehicle having a convertible roof attached to a vehicle body and a mechanism to move the roof from a stored position to a closed position using a lower tool frame, wherein the roof has a pair of lateral main support units, the lateral main support units being spaced apart from each other and fixed to opposite sides of the vehicle body, a fastening flange disposed on each of the pair of lateral main support units, wherein the fastening flanges are moveable along a predetermined portion of the lateral main support units, the fastening flange secures the convertible roof to the vehicle body, a linkage part extending from each of the pair of lateral main support units, wherein the linkage parts extends from each of the lateral main support units towards a windshield frame, at least one roof part, each of the at least one roof part extending between each linkage part, and the roof further includes a closure disposed at a free end of the roof for engaging a portion of the windshield frame and securing the roof in a closed position, the method comprising the steps of:

placing the pair of lateral main support units onto a lower tool frame fitted to receive the pair of lateral main support units in a spatial relationship to correspond with a disposition of the pair of lateral main support units as properly fitted on the vehicle body, wherein the pair of lateral main support units are disposed upside down on the lower tool frame relative to the proper disposition of the pair of lateral main support units on the vehicle body;

securing the at least one roof part to the linkage parts upside down; and positioning each of the fastening flanges with respect to one of the upside down lateral main support units and securing the fastening flanges thereto such that the fastening flanges are aligned with a predetermined location of the vehicle body.

2. The method as set forth in claim 1, further including a step of providing an upper tool frame.

3. The method as set forth in claim 2, further including a step of providing vehicle body pins, each vehicle body pin is disposed at the predetermined location on the vehicle body.

4. The method as set forth in claim 3, wherein the upper tool frame includes upper tool frame pins, the upper tool frame pins are in alignment with the vehicle body pins.

5. The method as set forth in claim 4, wherein the fastening flanges further include an elongated hole.

6. The method as set forth in claim 5 further including a step of lowering the upper tool frame onto the lower tool frame such that the pair of lateral support units are positioned between the lower tool frame and upper tool frame, and each of the upper tool frame pins engages a corresponding elongated hole of the fastening flanges thereby positioning said fastening flanges with respect to the pair of lateral support units in alignment to the vehicle body.

7. The method as set forth in claim 6 further including a step of providing a fastening means, the positioning of each of the fastening flanges with respect to the pair of lateral main support units and securing the fastening flanges compromising using the fastening means to fix each of the fastening flanges once the upper tool frame has positioned each of the fastening flanges in alignment with the vehicle body pins.

8. The method as set forth in claim 7, wherein the upper tool frame includes an adjustment member, the adjustment member adjusting the position of the fastening flanges so as to accommodate different roof designs, or roofs having rigid outer shell parts, the outer shell parts made of textile, or the outer shell parts made of vinyl.

9. The method as set forth in claim 8, wherein the upper tool frame further includes downwardly projecting fixing means for an adjustment of the closure to align with the windshield frame when the roof is in the closed position, the downwardly projecting means engaging the closure when the roof is being supported by the lower tool frame.

10. The method as set forth in claim 8, wherein the upper tool frame further includes downwardly extensible fixing means for an adjustment of the outer shell parts while the roof is being supported by the lower tool frame.

\* \* \* \* \*